United States Patent
Tsuchiya et al.

(10) Patent No.: US 9,692,024 B2
(45) Date of Patent: Jun. 27, 2017

(54) COVER MECHANISM COMPRISING SLIDE MEMBER AND ELECTRONIC DEVICE

(71) Applicant: CASIO COMPUTER CO., LTD., Shibuya-ku, Tokyo (JP)

(72) Inventors: Atsushi Tsuchiya, Fussa (JP); Shinichi Tamamoto, Tokyo (JP); Yuichi Nishimura, Saitama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 288 days.

(21) Appl. No.: 14/156,092

(22) Filed: Jan. 15, 2014

(65) Prior Publication Data
US 2014/0205892 A1    Jul. 24, 2014

(30) Foreign Application Priority Data

Jan. 22, 2013 (JP) .................... 2013-008946

(51) Int. Cl.
| | |
|---|---|
| H01M 2/10 | (2006.01) |
| H01M 2/02 | (2006.01) |
| H01M 2/20 | (2006.01) |

(52) U.S. Cl.
CPC ............ H01M 2/1066 (2013.01); *H01M 2/02* (2013.01); *H01M 2/1055* (2013.01); *H01M 2/1061* (2013.01); *H01M 2/20* (2013.01)

(58) Field of Classification Search
CPC .... H01M 2/10; H01M 2/1022; H01M 2/1044; H01M 2/1066; H01M 2/0404
See application file for complete search history.

(56) References Cited

U.S. PATENT DOCUMENTS

| | | | | |
|---|---|---|---|---|
| 5,722,705 | A | * | 3/1998 | Deguchi ............. H01M 2/1055 292/163 |
| 7,855,884 | B2 | | 12/2010 | Dong |
| 2007/0026888 | A1 | * | 2/2007 | Zhou ................... H04M 1/0262 455/550.1 |
| 2007/0296225 | A1 | * | 12/2007 | Ashton ................... E05B 13/10 292/163 |
| 2009/0323291 | A1 | * | 12/2009 | Dong ..................... E05C 19/06 361/726 |
| 2010/0188805 | A1 | * | 7/2010 | Zhou ................... H04M 1/0262 361/679.01 |

(Continued)

FOREIGN PATENT DOCUMENTS

| | | |
|---|---|---|
| JP | 05089863 A | 4/1993 |
| JP | 2011232412 A | 11/2011 |

(Continued)

OTHER PUBLICATIONS

Australian Office Action dated Nov. 7, 2014, issued in counterpart Australian Application No. 2014200077.

(Continued)

*Primary Examiner* — Kenneth Douyette
(74) *Attorney, Agent, or Firm* — Holtz, Holtz & Volek PC

(57) ABSTRACT

A cover mechanism includes a cover which is detachably attached to a housing and a slide member which is slidably attached to the housing. The slide member includes a lock portion which locks the cover to keep the cover closed and a push-up portion which pushes up the cover as the slide member slides in a direction to release the lock.

12 Claims, 9 Drawing Sheets

(56) References Cited

U.S. PATENT DOCUMENTS

2012/0028095 A1    2/2012  Wang et al.
2012/0045679 A1*   2/2012  Ishida ................ H01M 2/1066
                                                        429/100

FOREIGN PATENT DOCUMENTS

JP    2012-033489 A    2/2012
JP    2012-054193 A    3/2012

OTHER PUBLICATIONS

Japanese Office Action (and English translation thereof) dated Feb. 16, 2016, issued in counterpart Japanese Application No. 2013-008946.

* cited by examiner

COVER MECHANISM COMPRISING SLIDE MEMBER AND ELECTRONIC DEVICE

BACKGROUND OF THE INVENTION

1. Field of the Invention

The present invention relates to an open-and-close mechanism of a cover and an electronic device with a cover having the open-and-close mechanism.

2. Description of Related Art

Open-and-close mechanisms have been adopted to portable electronic devices. In one example, a finger is put into a slot formed at a housing to which a battery cover is detachably attached, and the finger is put on a tab provided on the battery cover to open the battery cover. In another example, a finger is put on a convex portion or a concave portion provided at a battery cover which is slidably attached to a housing to open the battery cover.

However, the above mechanism, wherein the slot is formed at the housing or wherein the tab, the convex portion or the concave portion is formed on the battery cover, has a problem that it cannot achieve a flat housing.

Recently, Japanese Patent Publication No. 2012-33489 proposes a lock mechanism which does not easily weaken and by which a battery lid can be easily removed and attached. This lock mechanism is used for locking the battery lid to a housing and includes a slide member attached to the housing, a pressing member and a hook provided at the battery lid. An engagement block, which is engaged with the hook, is provided at the slide member. The pressing member is attached to the slide member so as to be movable along a direction that intersects a sliding direction of the slide member. When the pressing member is pressed, the slide member is pressed by the pressing member and slides so as to move away from the battery lid. This movement releases the engagement between the hook of the battery lid and the engagement block.

Japanese Patent Publication No. 2012-54193 proposes a lock mechanism which prevents damage to a lock member and an engaging part when a lid member is attached to a housing part, with the lock member moved to a lock position. This lock mechanism comprises a lock member which is slidably arranged on a battery lid, and which moves between a lock position where the battery lid attached over an opening of a battery housing part is locked and a lock release position where the battery lid can be attached to and detached from the opening of the battery housing part. The lock mechanism further comprises an engaging part which is provided in the battery housing part for the engagement with the lock member moved to the lock position and an elastic body which is arranged integrally with the lock member, and which is elastically deformed by the lock member and at the same time converts elastic force into force to move the lock member toward the lock release position if the lock member makes contact with the engaging part when the battery lid closes the opening of the battery housing part.

The lock mechanisms in the above Japanese Patent Publications can achieve flat housings. However, after the lock is released by sliding the slide member or the lock member, the battery lid needs to be opened by lifting up the end thereof with a hand or by sliding the battery lid while pushing a surface thereof. Thus the opening operation of the lid is troublesome.

SUMMARY OF THE INVENTION

An object of the present invention is to provide an open-and-close mechanism of a cover which achieves a flat housing and which makes it possible to carry out releasing operation of a lock and opening operation at the same time so that the cover is smoothly opened.

In order to realize the above object, according to a first aspect of the present invention, there is provided a cover mechanism including a cover which is detachably attached to a housing and a slide member which is slidably attached to the housing, wherein the slide member includes a lock portion which locks the cover to keep the cover closed and a push-up portion which pushes up the cover as the slide member slides in a direction to release a lock.

According to a second aspect of the present invention, there is provided an electronic device including a cover mechanism including a housing, a cover which is detachably attached to the housing and a slide member which is slidably attached to the housing, wherein the slide member includes a lock portion which locks the cover to keep the cover closed and a push-up portion which pushes up the cover as the slide member is slid in a direction to release a lock.

The present invention achieves a flat housing and makes it possible to carry out releasing operation of a lock and opening operation at the same time so that a cover is smoothly opened.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENT

Hereinafter, an embodiment of the present invention will be described with reference to the drawings.

<First Embodiment>

Figure 1:
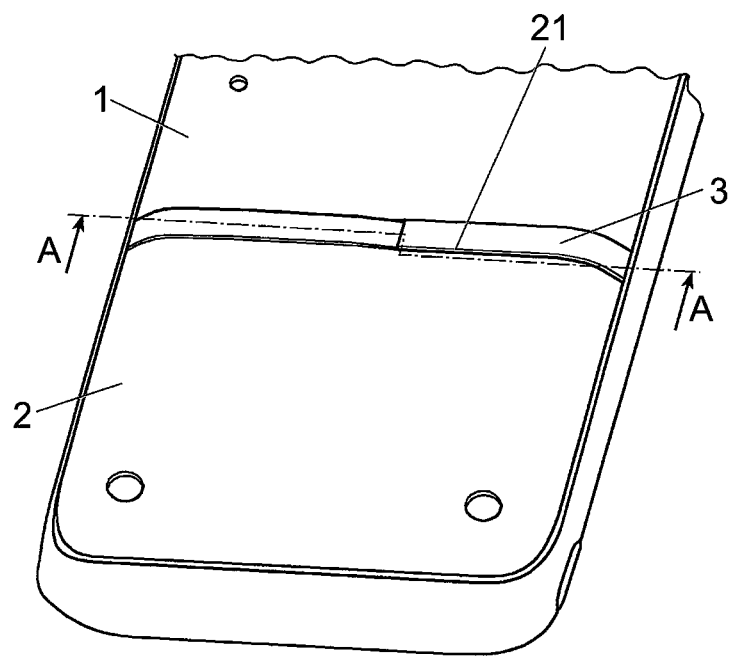
FIG. 1 is a schematic perspective view showing a battery cover of a scientific calculator which is an embodiment of an electronic device to which the present invention is applied.

FIG. 1 shows a battery cover of a scientific calculator as an embodiment of an electronic device according to the present invention. The reference numerals 1, 2 and 3 respectively indicate a housing, the battery cover and a slide member.

As shown in the figure, the battery cover 2 is detachably attached to the back of the housing 1 to cover an approximately half part thereof. The slide member 3 is attached along the upper edge of the battery cover 2 such that the slide member 3 can slide laterally. In the example shown in the figure, a level-difference is formed around the center of the upper edge of the battery cover 2. The slide member 3 is arranged at a level-difference portion 21 formed along the right half of the upper edge to achieve a flat outer surface of the housing 1.

Figure 4:
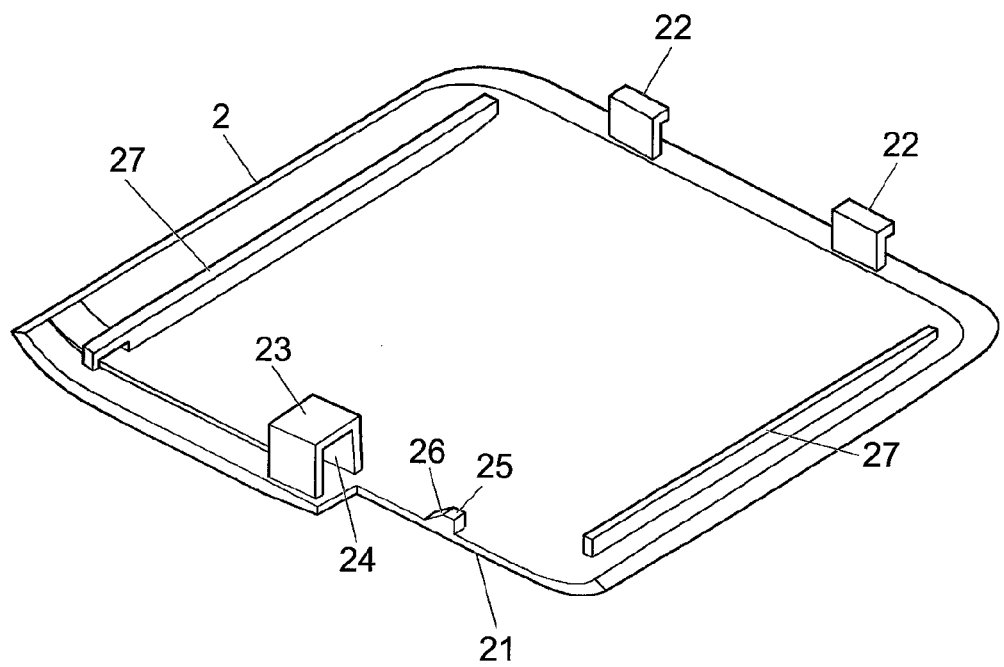
FIG. 4 is a perspective view of the battery cover seen from the inside.

As shown in FIG. 2 and FIG. 4, a couple of insert hooks 22 are formed along the lower edge of the battery cover 2 in the inside. A convex portion 23 is formed near the level-difference portion 21 on the upper edge. A projecting portion 25 is formed at the center of the level-difference portion 21. Ribs 27 are formed along the both lateral sides. A lock hole 24 opening toward the level-difference portion 21 is formed at the convex portion 23. The projecting portion 25 includes a slope 26 on the side of the convex portion 23.

Figure 2A:
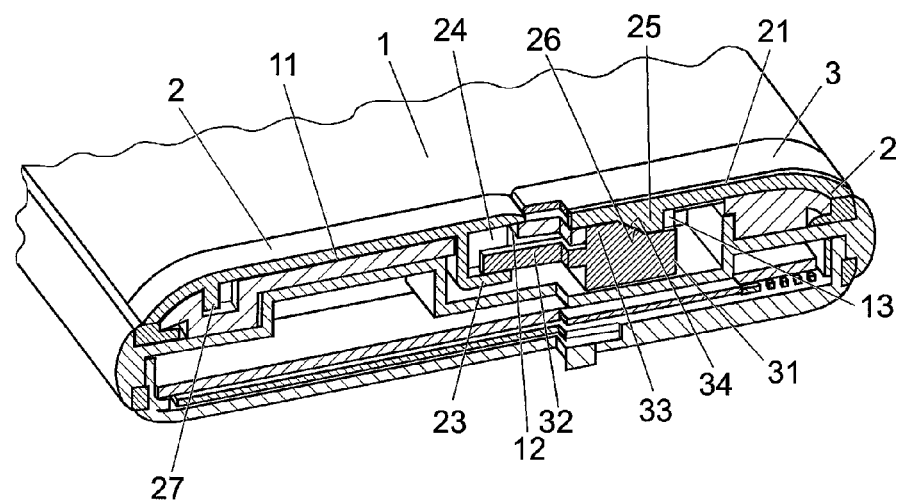
FIG. 2A is a cross-sectional view along the line indicated by the arrows A in FIG. 1.
Figure 2B:
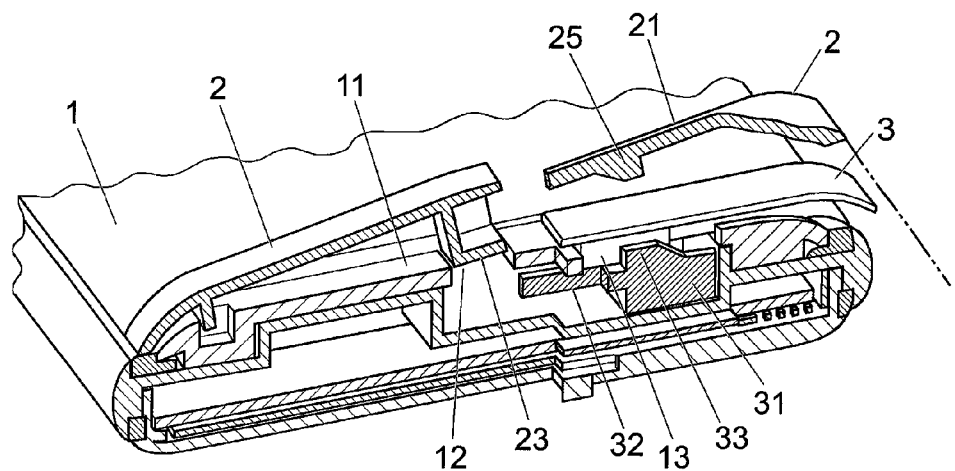
FIG. 2B shows removal of the battery cover in FIG. 2A.
Figure 3:
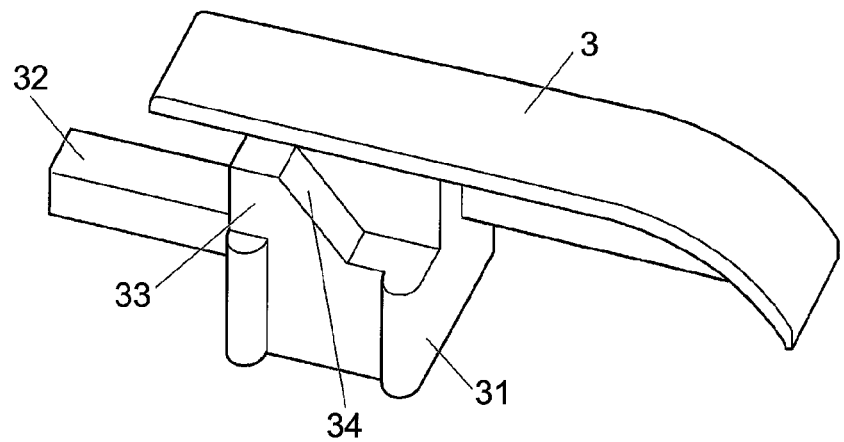
FIG. 3 is a perspective view of a slide member.

As shown in FIG. 2 and FIG. 3, the slide member 3 includes an outer surface portion which has the same thickness as a level-difference formed on the battery cover 2 and which fits the level-difference portion 21. Inside the outer surface portion, the slide member 3 includes a base portion 31 and a square-rod shaped lock portion 32 which projects to the left (operating direction for locking) from the base portion 31. Also, a push-up portion 33 which is adjacent to the outer surface portion and which projects upward is formed at the base portion 31. The push-up portion 33 includes a slope 34 on the opposite side of the lock portion 32. The surface of this slope 34 makes contact with the surface of the slope 26 of the battery cover 2. The lock portion 32 is inserted to the lock hole 24 of the battery cover 2.

Figure 5:
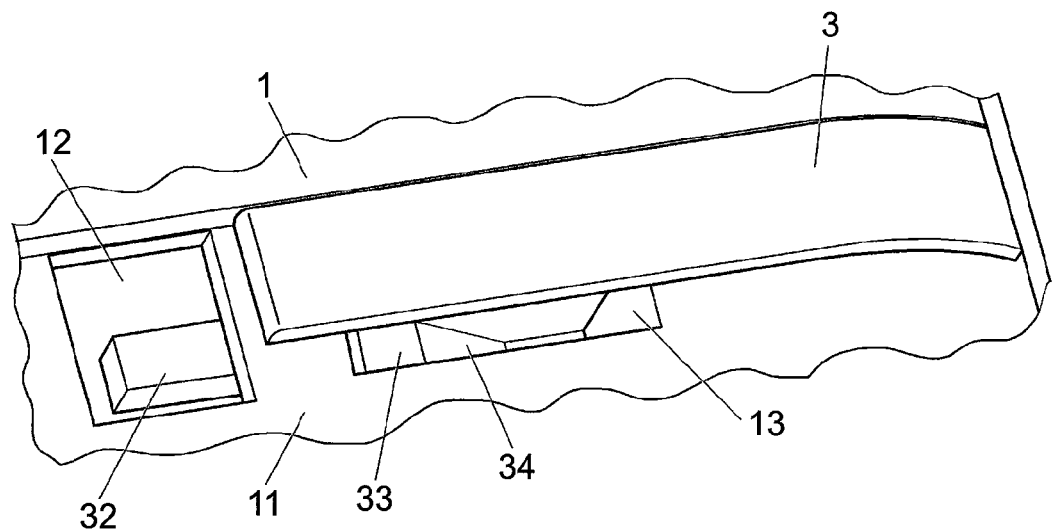
FIG. 5 is an enlarged perspective view of a portion of a housing around the slide member when the battery cover is removed.

As shown in FIG. 2 and FIG. 5, in a cover-acceptance concave portion 11 on the back side of the housing 1, an opening 12 to which the convex portion 23 of the battery cover 2 is inserted is formed at a position corresponding to the lock portion 32 of the slide member 3. Also, an opening 13 to which the projecting portion 25 of the battery cover 2 is inserted is formed at a position corresponding to the push-up portion 33 of the slide member 3.

Insert holes to which the insert hooks 22 of the battery cover 2 are respectively inserted and which are not shown in the drawings are formed on the lower edge of the housing 1 on the back side.

According to the above configuration, when the battery cover 2 is attached, the slide member 3 is slid to the left, and the lock portion 32 of the slide member 3 is inserted to the lock hole 24 in the convex portion 23 of the battery cover 2 to keep a locked state as shown in FIG. 2A. At the same time, the surface of the slope 34 of the push-up portion 33 of the slide member 3 makes contact with the surface of the slope 26 of the projecting portion 25 of the battery cover 2. The insert hooks 22 of the battery cover 2 are inserted to the insert holes of the housing 1.

Next, as shown in FIG. 2B, as the slide member 3 is slid to the right, that is, to the outside, the lock portion 32 begins to get out of the lock hole 24 of the battery cover 2 while the slope 26 of the projecting portion 25 is pushed up by the slope 34 in the push-up portion 33. As a result, at the same time as release of the lock, the upper edge and the right edge of the battery cover 2 are slightly pushed up to be in a pop-up mode. Therefore the battery cover 2 can be easily removed by hand.

According to the above open-and-close configuration of the battery cover 2 in the embodiment, a flat housing is achieved, and releasing operation of the lock of the battery cover 2 and pop-up operation are carried out at the same time so that the battery cover 2 is smoothly opened.

<Second Embodiment>

Figure 6:
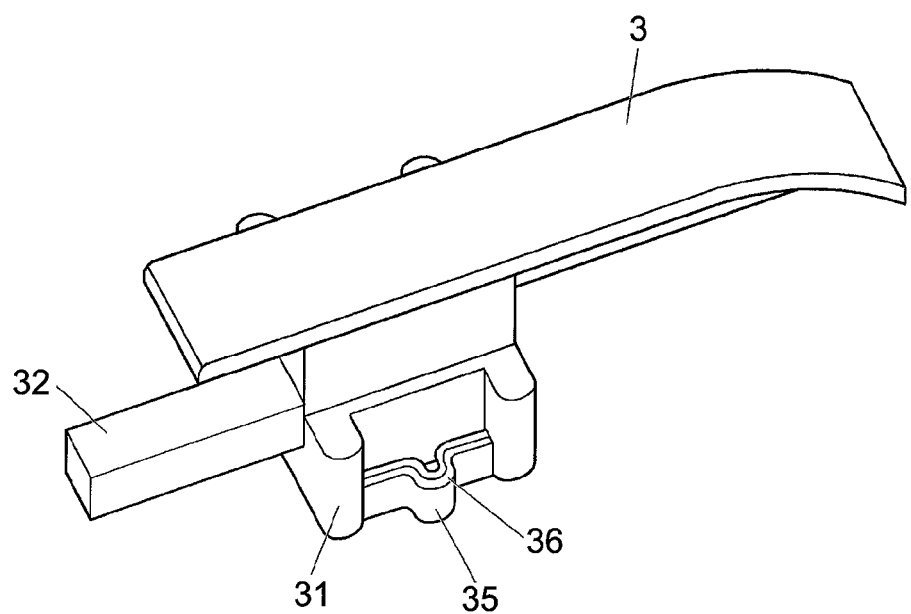
FIG. 6 is a perspective view of the slide member according to the second embodiment.

FIG. 6 shows the slide member 3 according to the second embodiment. In the same manner as the above first embodiment, the reference numerals 31 and 32 respectively indicate the base portion and the lock portion. Further, the reference numerals 35 and 36 respectively indicate an elastic portion (the push-up portion) and a slope.

In addition to the base portion 31 and the lock portion 32, as shown in the figure, the bridge-like elastic portion 35 which functions as the push-up portion, instead of the push-up portion 33 in the first embodiment, is formed in the base portion 31 inside the slide member 3. A slope 36 is formed along a bridge-like upper edge of the elastic portion 35.

Figure 7A:
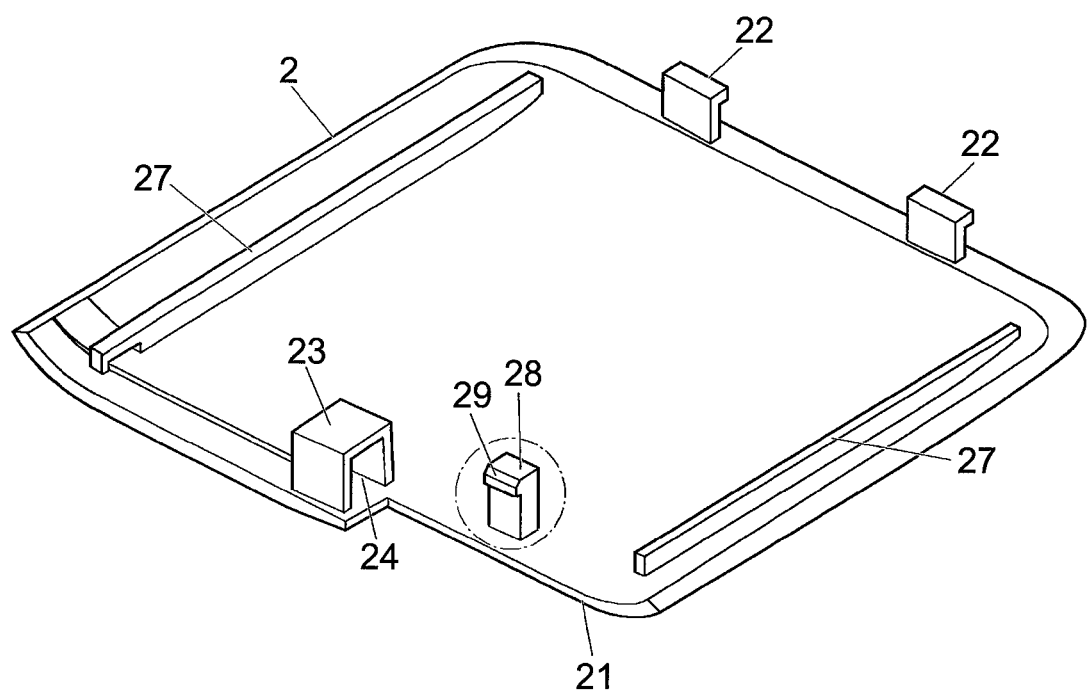
FIG. 7A is a perspective view of the battery cover seen from the inside.
Figure 7B:
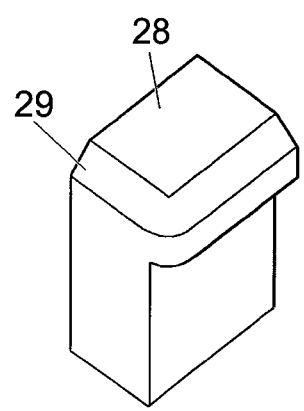
FIG. 7B is an enlarged view of a convex portion in FIG. 7A.

FIG. 7 shows the battery cover 2. In the same manner as the above first embodiment, the reference numerals 21, 22, 23, 24, 27, 28 and 29 respectively indicate the level-difference portion, the insert hooks, the convex portion, the lock hole, the ribs, the convex portion and the slope.

In addition to the level-difference portion 21, the insert hooks 22, the convex portion 23, the lock hole 24 and the ribs 27, as shown in the figure, the convex portion 28, instead of the projecting portion 25 in the first embodiment, is formed inside the battery cover 2. The L-shaped slope 29 is formed along an edge of the convex portion 28 at the end thereof. This slope 29 makes contact with the slope 36 in the elastic portion 35 of the slide member 3 with a predetermined pressure.

Figure 8:
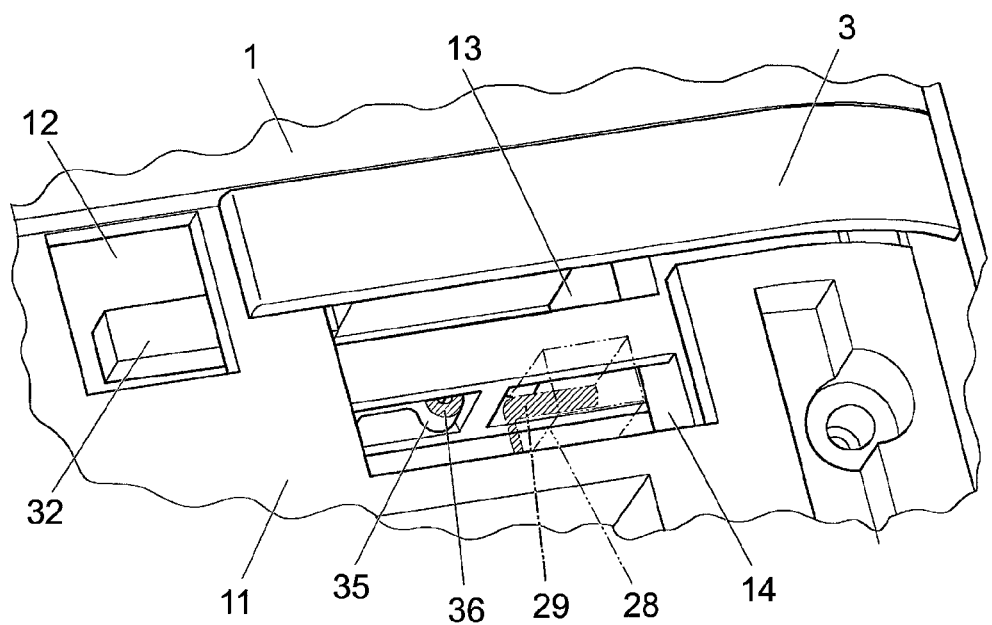
FIG. 8 is an enlarged perspective view of a portion of the housing around the slide member when the battery cover is removed.

FIG. 8 shows a portion of the housing 1 around the slide member 3 when the battery cover 2 is removed. In the same manner as the above first embodiment, the reference numerals 11, 12 and 13 respectively indicate the cover-acceptance concave portion, the opening to which the convex portion 23 of the battery cover 2 is inserted and the opening wherein the base portion 31 of the slide member 3 moves.

As shown in the figure, in addition to the openings 12, 13, an opening 14 to which the convex portion 28 of the battery cover 2 is inserted is formed at a position corresponding to the elastic portion 35 of the slide member 3.

According to the above configuration, when the battery cover 2 is attached, the lock portion 32 of the slide member 3 is inserted to the lock hole 24 in the convex portion 23 of the battery cover 2 to keep a locked state as shown in FIG. 8. At the same time, the slope 36 in the elastic portion 35 of the slide member 3 makes contact with the slope 29 in the convex portion 28 of the battery cover 2 with pressure.

As the slide member 3 is slid to the right, the lock portion 32 begins to get out of the lock hole 24 of the battery cover 2 while the convex portion 28 is pushed up by the elastic portion 35 via the slopes 36, 29. As a result, in the same manner as the first embodiment, at the same time as release of the lock, the upper edge and the right edge of the battery cover 2 are slightly pushed up to be in a pop-up mode. Therefore the battery cover 2 can be easily removed by hand.

<Third Embodiment>

FIG. 9 shows the third embodiment. In the same manner as the above first embodiment, the reference numerals 1, 11, 12, 2, 21, 23, 24, 27, 3 and 32 respectively indicate the housing, the cover-acceptance concave portion, the opening, the battery cover, the level-difference portion, the convex portion, the lock hole, the ribs, the slide member and the lock portion. Further, the reference numerals 17 and 37 respectively indicate an inclined guide and lateral convex portions.

Figure 10:
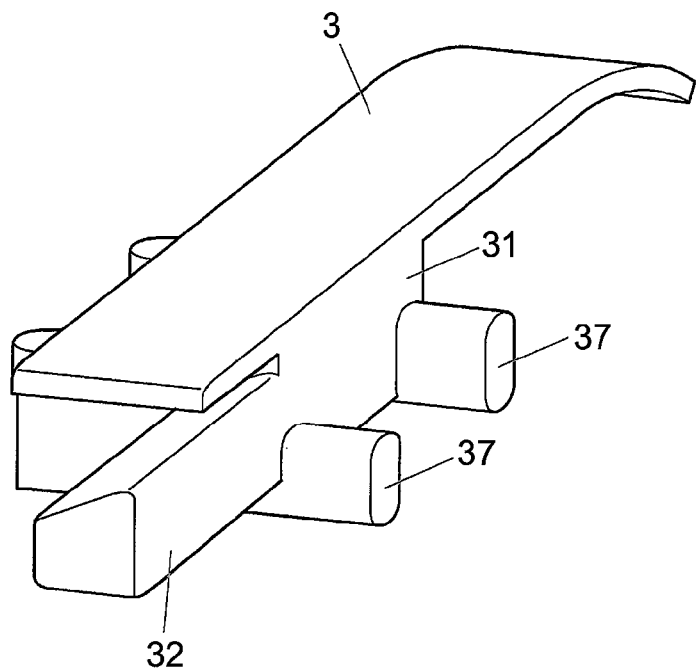
FIG. 10 is a perspective view of the slide member.

As shown in FIG. 10, in addition to the base portion 31 and the lock portion 32, a couple of lateral convex portions 37 having different heights are formed on the base portion 31 inside the slide member 3. In the example of the figure, the lateral convex portion 37 on the left is at a higher position than the lateral convex portion 37 on the right. The lock portion 32 has a trapezoid shape which includes a slope on the upper side.

Figure 11:
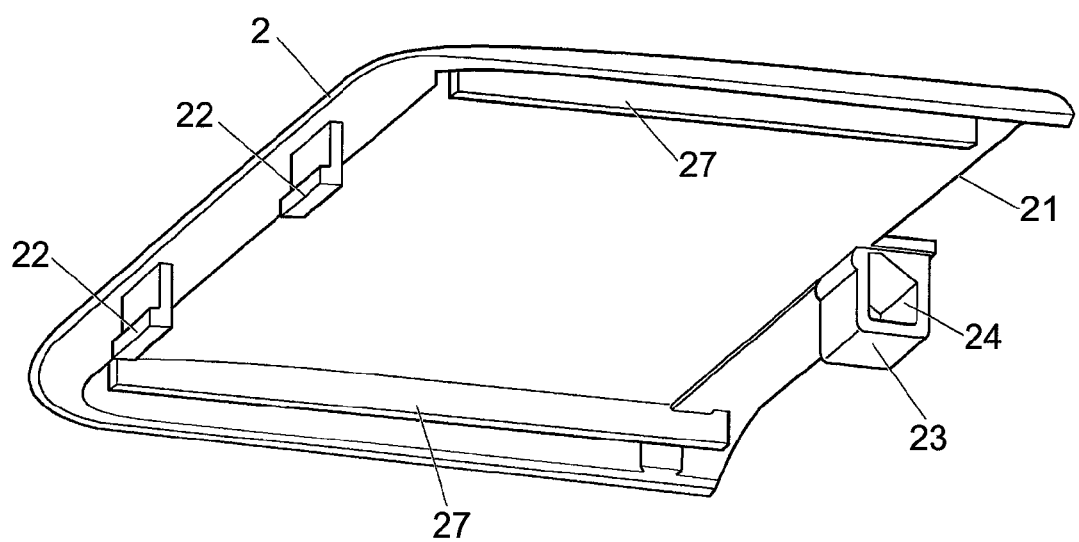
FIG. 11 is a perspective view of the battery cover seen from the inside.

As shown in FIG. 11, the level-difference portion 21, the insert hook 22, the convex portion 23, the lock hole 24, the ribs 27 are formed inside the battery cover 2. The lock hole 24 has a trapezoid shape which includes a slope on the upper side.

The inclined guide 17 which is a slot is formed inside the housing 1. This inclined guide 17 rises toward right, and the couple of lateral convex portions 37 of the slide member 37 are inserted thereto.

Figure 9A:
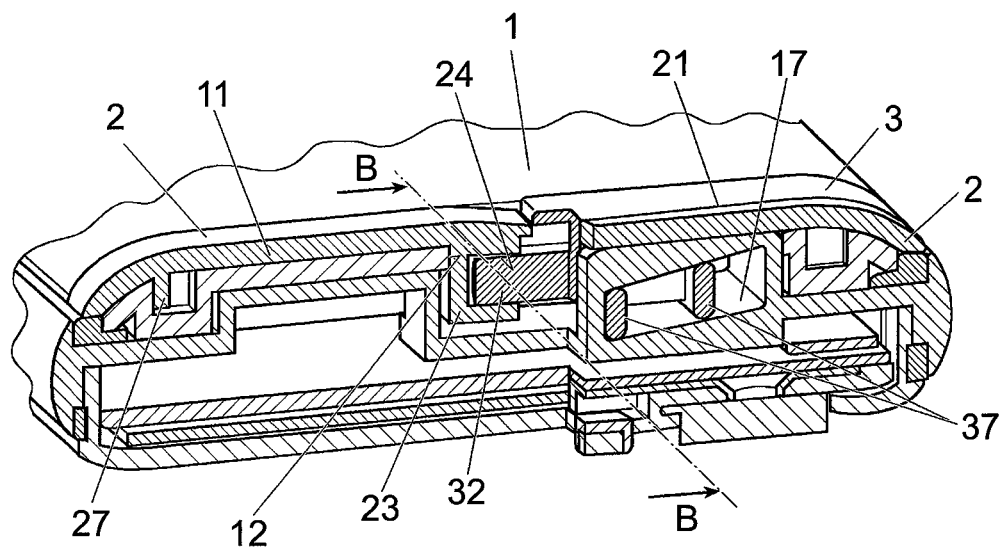
FIG. 9A is a cross-sectional view similar to FIG. 2A showing the third embodiment.
Figure 12A:
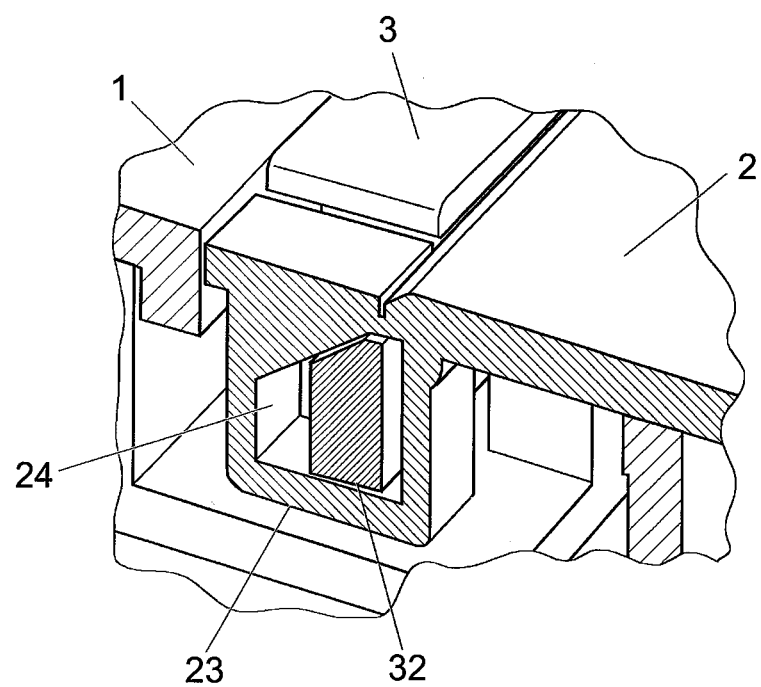
FIG. 12A is a perspective view of an essential part in cross section along the line indicated by the arrows B in FIG. 9A.

According to the above configuration, when the battery cover 2 is attached, the lock portion 32 of the slide member 3 is inserted to the lock hole 24 in the convex portion 23 of the battery cover 2 to keep a locked state as shown in FIG. 9A and FIG. 12A. At the same time, the lateral convex portions 37 of the slide member 3 are on the left side in the slot of the inclined guide 17 inside the housing 1.

Figure 9B:
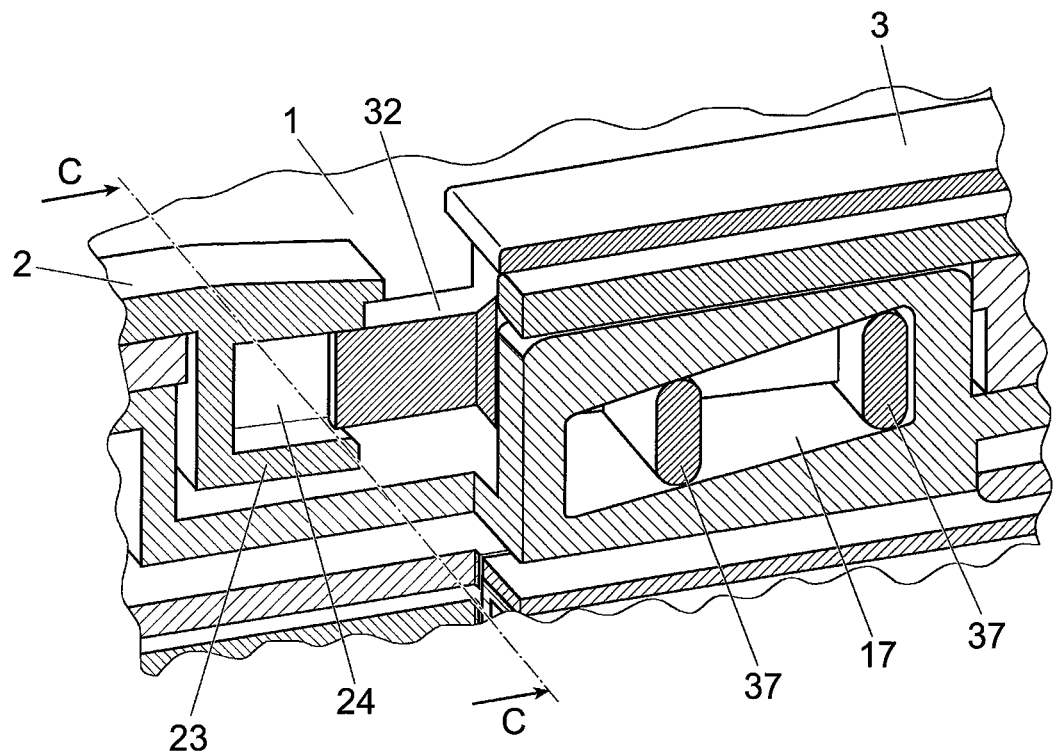
FIG. 9B shows the battery cover of FIG. 9A in a pop-up mode.
Figure 12B:
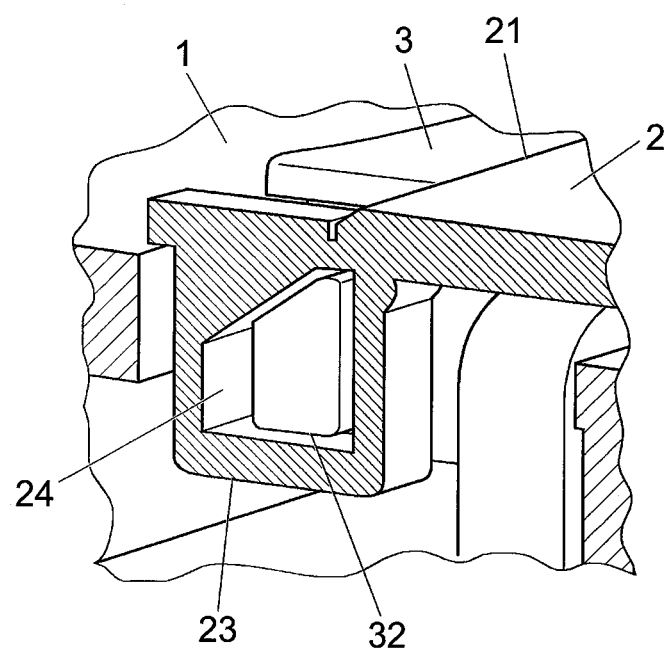
FIG. 12B is a perspective view of an essential part in cross section along the line indicated by the arrows C in FIG. 9B.

As shown in FIG. 9B, as the slide member 3 is slid to the right, the lock portion 32 begins to get out of the lock hole 24 of the battery cover 2 while the lateral convex portions 37 of the slide member 3 moves to the right in the slot of the inclined guide 17 inside the housing 1 so that the slide member 3 rises slightly. At the same time, the lock hole 24 is pushed up by the lock portion 32 via the upper slope as shown in FIG. 12B. Thus the convex portion 23 is pushed up, and as a result, in the same manner as the first embodiment, at the same time as release of the lock, the upper edge and the right edge of the battery cover 2 are slightly pushed up to be in a pop-up mode. Therefore the battery cover 2 can be easily removed by hand.

[Modification]

In the above embodiment, the scientific calculator is illustrated. However, the present invention is not limited to this, and can be applied to other electronic devices such as a camera and a cellular phone.

Also, in the above embodiment, the battery cover is illustrated. However, the present invention can be applied to covers or lids for other parts.

Further, shapes, etc. of the cover, the slide member, the lock portion and the push-up portion can be determined freely. In addition, details can be modified at will.

Though several embodiments of the present invention are illustrated, the scope of the invention is not limited to the above embodiments but includes the scope of claims attached below and the scope of their equivalents.

This U.S. patent application claims priority to Japanese patent application No. 2013-008946 filed on Jan. 22, 2013, the entire contents of which are incorporated by reference herein for correction of incorrect translation.

What is claimed is:

1. A cover mechanism comprising:
    a cover which is detachably attached to a housing and on an inside of which a first convex portion is provided; and
    a slide member which is slidably attached to the housing, wherein the slide member includes:
        a lock portion which keeps the cover in a closed position when the slide member is slid in a direction for locking; and
        a push-up portion which is elastic and which pushes up the cover when the slide member is slid in a direction to release the locking;
    wherein the push-up portion has a slope,
    wherein the first convex portion has a slope at an end thereof, and
    wherein the slope of the first convex portion makes contact with the slope of the push-up portion with pressure, whereby the push-up portion pushes up the cover when the slide member is slid in the direction to release the locking.

2. The cover mechanism according to claim 1, wherein the lock portion is a rod extending in the direction for locking from a base portion of the slide member, and
    wherein a second convex portion having a lock hole into which the rod is insertable is provided inside the cover.

3. The cover mechanism according to claim 2, wherein a surface of the slope of the push-up portion makes contact with a surface of the slope of the first convex portion.

4. The cover mechanism according to claim 3,
    wherein the cover includes a level-difference portion, and
    wherein the slide member includes an outer surface portion which fits a level-difference of the level-difference portion and a base portion provided inside the outer surface portion, the base portion including the lock portion and the push-up portion.

5. The cover mechanism according to claim 1, wherein a surface of the slope of the push-up portion makes contact with a surface of the slope of the first convex portion.

6. The cover mechanism according to claim 1, wherein the cover includes a level-difference portion, and
    wherein the slide member includes an outer surface portion which fits a level-difference of the level-difference portion and a base portion provided inside the outer surface portion, the base portion including the lock portion and the push-up portion.

7. An electronic device comprising:
    a cover mechanism including a housing, a cover which is detachably attached to the housing and on an inside of which a first convex portion is provided, and a slide member which is slidably attached to the housing,
    wherein the slide member includes:
        a lock portion which keeps the cover in a closed position when the slide member is slid in a direction for locking; and
        a push-up portion which is elastic and which pushes up the cover when the slide member is slid in a direction to release the locking;
    wherein the push-up portion has a slope,
    wherein the convex portion has a slope at an end thereof, and
    wherein the slope of the convex portion makes contact with the slope of the push-up portion with pressure, whereby the push-up portion pushes up the cover when the slide member is slid in the direction to release the locking.

8. The electronic device according to claim 7,
    wherein the lock portion is a rod extending in the direction for locking from a base portion of the slide member, and wherein a second convex portion having a lock hole into which the rod is insertable is provided inside the cover.

9. The electronic device according to claim 8, a surface of the slope of the push-up portion makes contact with a surface of the slope of the first convex portion.

10. The electronic device according to claim 9,
wherein the cover includes a level-difference portion, and
wherein the slide member includes an outer surface portion which fits a level-difference of the level-difference portion and a base portion provided inside the outer surface portion, the base portion including the lock portion and the push-up portion.

11. The electronic device according to claim 7, a surface of the slope of the push-up portion makes contact with a surface of the slope of the first convex portion.

12. The electronic device according to claim 7,
wherein the cover includes a level-difference portion, and
wherein the slide member includes an outer surface portion which fits a level-difference of the level-difference portion and a base portion provided inside the outer surface portion, the base portion including the lock portion and the push-up portion.

* * * * *